(12) United States Patent
Huang et al.

(10) Patent No.: US 8,464,593 B2
(45) Date of Patent: Jun. 18, 2013

(54) INTEGRATED MICRO-MACHINED AIR FLOW VELOCITY METER FOR PROJECTILE ARMS

(75) Inventors: Liji Huang, San Jose, CA (US); Wei Ching, Menlo Park, CA (US); Chih-Chang Chen, Cupertino, CA (US)

(73) Assignee: Siargo, Ltd., Santa Clara, CA (US)

( * ) Notice: Subject to any disclaimer, the term of this patent is extended or adjusted under 35 U.S.C. 154(b) by 222 days.

(21) Appl. No.: 12/786,233

(22) Filed: May 24, 2010

(65) Prior Publication Data

US 2011/0283812 A1    Nov. 24, 2011

(51) Int. Cl.
*G01F 1/00* (2006.01)
*G01F 1/68* (2006.01)

(52) U.S. Cl.
USPC .......................................... 73/861; 73/204.26

(58) Field of Classification Search
None
See application file for complete search history.

(56) References Cited

U.S. PATENT DOCUMENTS

| 6,672,152 B2 * | 1/2004 | Rouse et al. ............... 73/170.02 |
| 2007/0017285 A1 * | 1/2007 | Wang et al. ............... 73/204.26 |
| 2007/0022807 A1 * | 2/2007 | Miller et al. ............... 73/170.02 |

\* cited by examiner

*Primary Examiner* — Harshad R Patel

(57) ABSTRACT

An apparatus integrated with micromachined (a.k.a. MEMS, Micro Electro Mechanical Systems) silicon sensor to measure air flow velocity on targeting correction for projectiles arms is disclosed in the present invention. The air flow velocity component perpendicular to the travel direction of bullets with respect to projectile arm body (e.g. bullets, shells, or arrows) has main effect to the targeting accuracy. Such effect is pretty much determined by the wind speed and the projectile travel distance. The integration with MEMS mass flow sensor has made the invented apparatus possible to be compact, low power consumption, low cost and high accuracy. The low power consumption characteristic of MEMS mass flow sensor is especially crucial for making the apparatus of present invention feasible by battery operated.

4 Claims, 3 Drawing Sheets

INTEGRATED MICRO-MACHINED AIR FLOW VELOCITY METER FOR PROJECTILE ARMS

FIELD OF THE INVENTION

Figure 1:
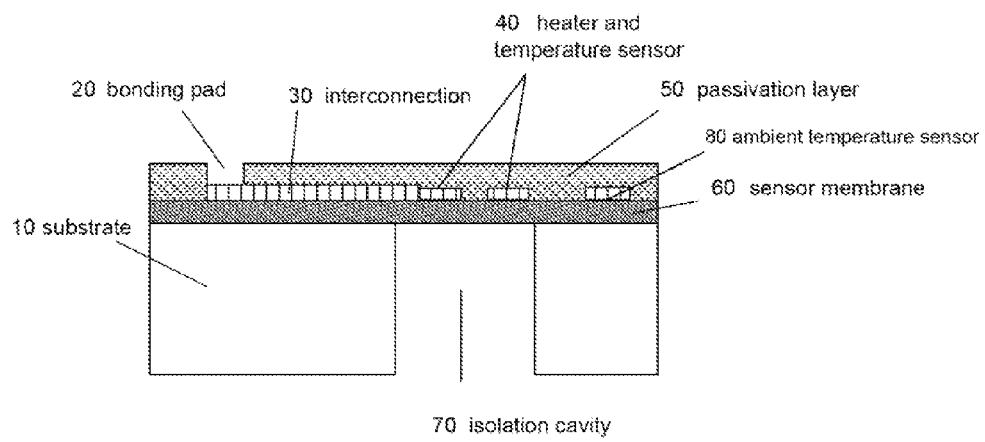

The embodiments of present invention are disclosed and written based on the application of a provisional patent (U.S. 61/220,290) which was previously filed on Jun. 25, 2009. The present invention relates to an apparatus which can precisely measure air flow velocity nearby a projectile arm for the purpose of targeting correction through the preambles of independent claims. The present invention also provides the methods and process for integrating the micromachined or Micro Electro Mechanical Systems (MEMS) flow sensor into the air flow velocity meter for projectile arms.

BACKGROUND OF THE INVENTION

The air flow component perpendicular to the travel direction of bullets with respect to projectile (e.g. bullets, shells, or arrows) arm body has major impact to the accuracy in targeting. Such impact is proportional to the wind speed and the projectile travel distance, the longer the severer. The methods on current targeting corrections in such arms with less advanced configurations are based on shooter's experiences as well as some assistance of a light article, for instance a piece of cloth, drifted by wind, which is without the capability of a precise measurement for air flow velocity. Prediction of the targeting variance against air flow velocity can be estimated by calculation using a linear approach.

Measurement of the air flow speed can be done currently by three technologies: cup anemometers that are bulky, mechanical in nature, and with a slow response time. Furthermore, cup anemometers measure only the average air flow speed and cannot provide accurate perpendicular flow speed component that is required for aiming adjustment, which is in the scope of this invention. Another technology is the conventional thermal anemometers. They have the same limitation so as not be able to measure air flow components in certain directions, as well as having a slow response time. Ultrasonic approach is again very bulky, expensive and difficult to be adapted to the requirements of the scopes of the current invention. Therefore it is very desirable for the present invention to improve the design and method for an air flow velocity meter on targeting correction of projectile arms.

SUMMARY OF THE INVENTION

The invention is for a compact yet sophisticated air mass flow meter integrated with Micro-Electro-Mechanical (MEMS) mass flow sensor and electronics for the meter system. The meter can be made as a standalone unit that can be fixed to the projectile arms for precise measurement of the air flow velocity. And the micro computer inside the meter outputs instantly both the velocity as well as the calculated deviation of the target from where it should be under a zero air flow condition. It further can be embedded into the projectile arms so that the meter can be functional whenever it is needed. It can yet further be applied for other purposes such as the sport activities when the air flow velocity is a factor that will cause to deviate from the best performance of such compared to that in the static air conditions. The key component of the invented air flow velocity meters is the MEMS mass flow sensor, which contains freestanding membranes, cavities, micro channels and/or multi-layered structures. The invention can be manufactured using a CMOS (complimentary metal-oxide-semiconductor) compatible process, thereof it provides easy manufacturability and can be mass and batch produced. The invention contains a MEMS mass flow sensor, electronics with a microcomputer providing a response as fast as 10 milliseconds, and a LCD display with backlight.

For the precise air flow velocity measurement, this invention measures the thermal conductivity or thermal capacity of the air, and calibrated with a standard condition thus provide not only the air flow speed but air mass flow speed that automatically compensates the variations of the air pressure, temperature and humidity. The air mass flow speed is much more important for the projectile arms since the impact to the projectiles by the air is the mass flow impact, not the air flow speed measured by the mechanical meters.

BRIEF DESCRIPTIONS OF THE DRAWINGS

FIG. 1 is the illustration of MEMS mass flow sensor configuration.

Figure 2:
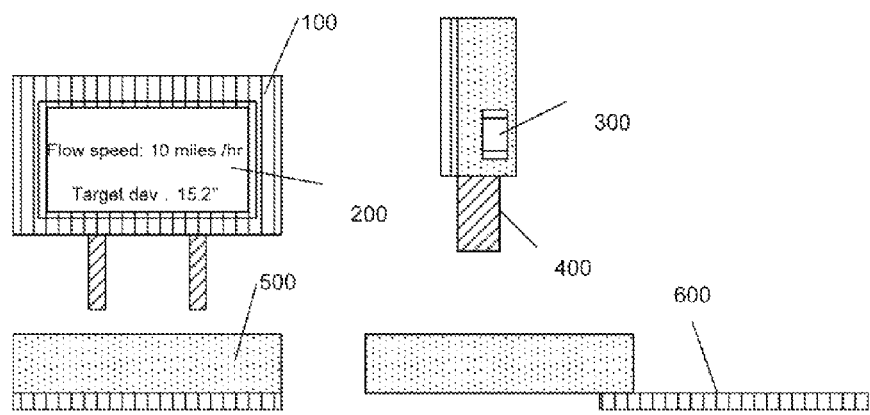
Figure 3:
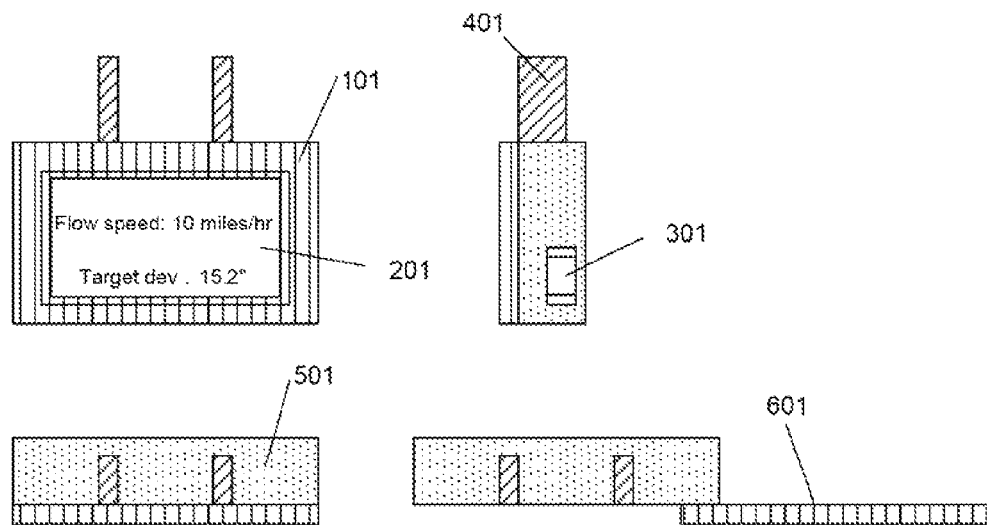
Figure 4:
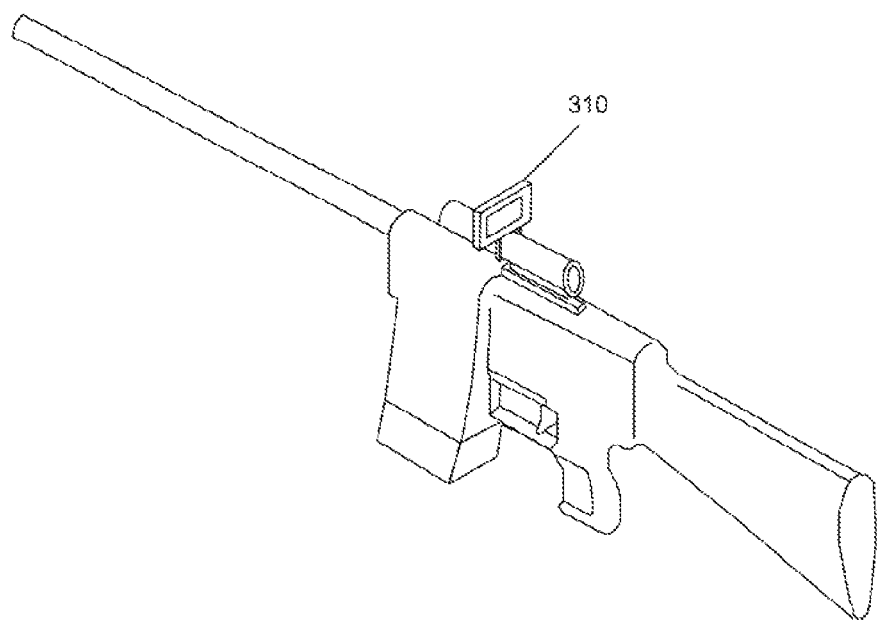

FIG. 2 is the illustration of an air flow speed meter, standalone version 100—meter face; 200—display; 300—flow channel; 400—adjustable fixer 500—meter body; 600—detachable meter display unit FIG. 3 is the illustration of an alternative air flow speed meter, standalone version 101—meter face; 201—display; 301—flow channel; 401—adjustable fixer 501—meter body; 601—detachable meter display unit FIG. 4 is shown the schematic of the meter installed on a projectile arm as in a detachable configuration.

Figure 5:
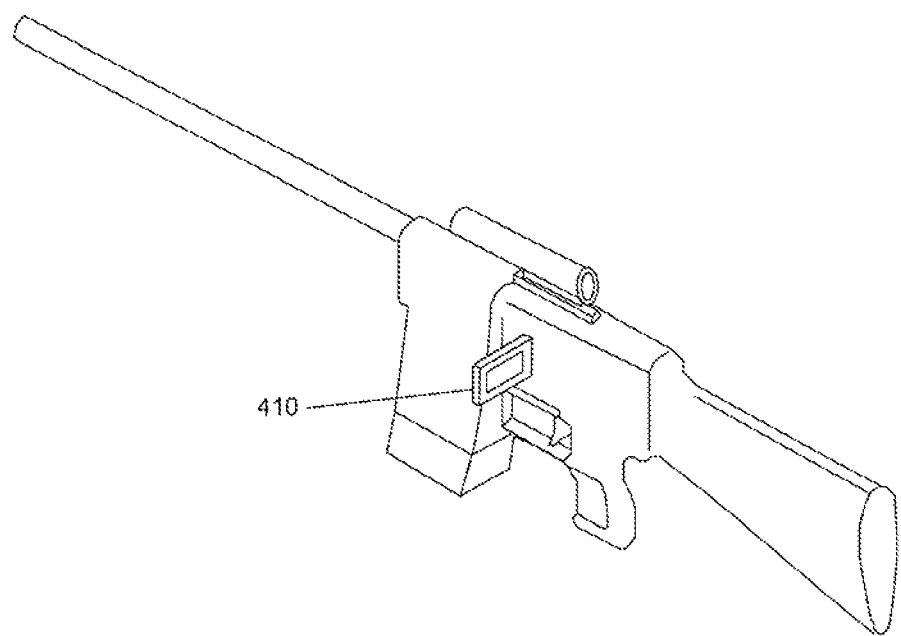

FIG. 5 is shown the schematic of the meter installed on a projectile arm as in an embedded configuration

DETAILED DESCRIPTION OF THE PREFERRED EMBODIMENTS

FIG. 1 illustrates a cross section view of preferred MEMS flow sensor topology. The working principle behind air flow velocity measurement is primarily based on anemometry and calorimetry. There is one heater resistor and two temperature sensing resistors (component 40) disposed on the sensor membrane (component 60) which is extending over the isolation cavity (component 70). There is a control circuit to keep the heater resistor temperature constantly above the ambient temperature which is measured by the ambient temperature sensor resistor (component 80) disposed on the substrate (component 10). The two temperature sensing resistors disposed each side of the heater resistor are worked as the flow speed sensing elements by measuring the temperature distribution which is shifted by the air flow. The passivation layer (component 50) is used to protect the resistors from moisture and contamination.

FIG. 2 depicts front, side, and top views as pictorial illustration of the complete apparatus for the first preferred embodiment as detachable version of the present invention. The MEMS mass flow sensor is packed into the side wall of flow channel 300 which is incorporated in the meter body 500. The MEMS mass flow sensor is designed as by-directional functionality therefore it could measure the air mass flow in either direction inside the flow passage. The display unit 200 will exhibit the instant air flow speed perpendicular to bullet travel direction and calculate the predicted deviation value in the distance perpendicular to bullet travel direction as well by micro controller, which is the desired and useful information for targeting correction. In this detachable version, the air flow meter could be separated with the projectile body which is convenient for user to use the apparatus in other projectiles.

FIG. 3 depicts front view, side view, and top view as pictorial illustration of the complete apparatus for the second preferred embodiment as embedded version of the present invention. The configuration of the apparatus is pretty similar to previous one on FIG. 2 besides the apparatus will be permanently affixed to the projectile body without the freedom for detachment. FIG. 4 and FIG. 5 are shown the demonstration with the apparatus of the present invention installed on the projectile body.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims

We claim:

1. A micro-machined air flow velocity meter for projectile arms comprising:
    a portable stand-alone package detachably mounted on a projectile arms body;
    an air flow channel built inside said portable stand-alone package;
    a micro-machined silicon air flow sensor mounted on a side wall of said air flow channel:
    a printed circuit board with a microcontroller to control, said micro-machined silicon air flow sensor and to collect air flow measurement data and output both a horizontal air velocity as well as a calculated deviation of a target from where it should be under a zero air flow condition in a perpendicular direction; and
    a LCD or LED display for displaying air flow and correction data for projectile arms targeting.

2. The micro-machined air flow velocity meter for projectile arms of claim 1 wherein:
    said micro-machined silicon air flow sensor is designed and calibrated with capability to measure air flow velocity in a bi-directional way.

3. The micro-machined air flow velocity meter for projectile arms of claim 1 wherein:
    said air flow channel's direction is perpendicular to projectile arm bodies and parallel to ground surface.

4. The micro-machined air flow velocity meter for projectile arms of claim 1 wherein:
    said microcontroller in said printed circuit board can combine previously known information of target distance and measured air flow velocity to calculate correction data for projectile targeting and then display on said LCD/LED) display.

* * * * *